(12) United States Patent
Ausbeck, Jr.

(10) Patent No.: US 8,330,731 B2
(45) Date of Patent: Dec. 11, 2012

(54) METHOD AND APPARATUS FOR INITIATING ONE-DIMENSIONAL SIGNALS WITH A TWO-DIMENSIONAL POINTING DEVICE

(75) Inventor: Paul J. Ausbeck, Jr., Campbell, CA (US)

(73) Assignee: Synaptics Incorporated, Santa Clara, CA (US)

( * ) Notice: Subject to any disclaimer, the term of this patent is extended or adjusted under 35 U.S.C. 154(b) by 1071 days.

(21) Appl. No.: 12/236,290

(22) Filed: Sep. 23, 2008

(65) Prior Publication Data

US 2009/0015566 A1 Jan. 15, 2009

Related U.S. Application Data

(62) Division of application No. 11/045,263, filed on Jan. 27, 2005, now Pat. No. 7,446,754.

(60) Provisional application No. 60/540,534, filed on Jan. 29, 2004.

(51) Int. Cl.
*G09G 5/00* (2006.01)
(52) U.S. Cl. .......... 345/173; 345/156; 345/684; 345/687
(58) Field of Classification Search .................. 345/173, 345/156, 684, 687
See application file for complete search history.

(56) References Cited

U.S. PATENT DOCUMENTS

| | | | |
|---|---|---|---|
| 4,103,252 A | 7/1978 | Bobick | |
| 4,736,191 A | 4/1988 | Matzke et al. | |
| 4,758,830 A | 7/1988 | Levien et al. | |
| 4,951,036 A | 8/1990 | Grueter et al. | |
| 5,159,159 A | 10/1992 | Asher | |
| 5,313,229 A | 5/1994 | Gilligan et al. | |
| 5,453,761 A | 9/1995 | Tanaka | |
| 5,530,455 A | 6/1996 | Gillick et al. | |
| 5,581,681 A | 12/1996 | Tchao et al. | |
| 5,659,333 A | 8/1997 | Okishima | |
| 5,726,687 A * | 3/1998 | Belfiore et al. | 715/785 |
| 5,748,185 A | 5/1998 | Stephan et al. | |
| 5,771,280 A | 6/1998 | Johnson | |
| 5,788,288 A | 8/1998 | Jostein | |
| 5,889,236 A | 3/1999 | Gillespie et al. | |
| 5,903,229 A | 5/1999 | Kishi | |

(Continued)

FOREIGN PATENT DOCUMENTS

EP 1079325 2/2001

(Continued)

OTHER PUBLICATIONS

Japanese Office Action P2006-551-489 dated Jun. 7, 2011.

(Continued)

*Primary Examiner* — William Boddie
*Assistant Examiner* — Leonid Shapiro
(74) *Attorney, Agent, or Firm* — Ingrassia Fisher & Lorenz P.C.

(57) ABSTRACT

Scrolling or other user interface functions are provided in response to two-dimensional inputs produced by a touchpad or other input device. The user initially touches the touch sensor in an area near a periphery of the touch sensor and moves his or her finger along the periphery of the device, and then provides a subsequent motion of the finger across the touch sensor in a direction that departs from the periphery. The amount of scrolling produced on the computing system may be determined as a function of a distance moved by the user's finger.

20 Claims, 10 Drawing Sheets

U.S. PATENT DOCUMENTS

| | | | |
|---|---|---|---|
| 5,912,661 A | 6/1999 | Siddiqui | |
| 5,943,052 A | 8/1999 | Allen et al. | |
| 6,067,075 A | 5/2000 | Pelanek | |
| 6,243,071 B1 | 6/2001 | Shwarts et al. | |
| 6,259,432 B1 | 7/2001 | Yamada et al. | |
| 6,266,050 B1 | 7/2001 | Oh et al. | |
| 6,271,824 B1 | 8/2001 | Chang | |
| 6,486,896 B1 | 11/2002 | Ubillos | |
| D469,109 S | 1/2003 | Andre et al. | |
| 6,522,128 B1 | 2/2003 | Ely et al. | |
| D472,245 S | 3/2003 | Andre et al. | |
| 6,587,093 B1 * | 7/2003 | Shaw et al. | 345/163 |
| 6,707,449 B2 | 3/2004 | Hinckley et al. | |
| 6,727,929 B1 * | 4/2004 | Bates et al. | 715/862 |
| 6,771,280 B2 * | 8/2004 | Fujisaki et al. | 345/684 |
| 6,788,288 B2 | 9/2004 | Ano | |
| 6,888,536 B2 | 5/2005 | Westerman et al. | |
| 7,046,230 B2 | 5/2006 | Zadesky et al. | |
| 7,233,316 B2 | 6/2007 | Smith et al. | |
| 7,312,785 B2 | 12/2007 | Tsuk et al. | |
| 7,345,671 B2 | 3/2008 | Robbin et al. | |
| 7,609,253 B2 | 10/2009 | Trent, Jr. et al. | |
| 2003/0076301 A1 | 4/2003 | Tsuk et al. | |
| 2003/0076303 A1 | 4/2003 | Huppi | |
| 2003/0076306 A1 | 4/2003 | Zadesky et al. | |
| 2003/0095096 A1 | 5/2003 | Robbin et al. | |
| 2003/0174149 A1 | 9/2003 | Fujisaki et al. | |
| 2003/0210286 A1 | 11/2003 | Gerpheide et al. | |
| 2004/0021694 A1 | 2/2004 | Doar | |

FOREIGN PATENT DOCUMENTS

| | | |
|---|---|---|
| GB | 2050621 | 1/1981 |
| JP | 05289811 | 11/1993 |
| JP | 6111695 | 4/1994 |
| JP | 07121291 | 5/1995 |
| JP | 9230993 A | 9/1997 |
| JP | 11105646 | 4/1999 |
| JP | 11105646 A | 4/1999 |
| JP | 11112254 A2 | 4/1999 |
| JP | 11194863 | 7/1999 |
| JP | 11194883 | 7/1999 |
| WO | 9420928 | 9/1994 |
| WO | 0127733 | 4/2001 |

OTHER PUBLICATIONS

Japanese Office Action P2006-551417 dated Jun. 7, 2011.
Japanese Office Action P2010246303 dated Jun. 14, 2011.
U.S. Office Action dated Jul. 8, 2011, U.S. Appl. No. 11/059,059.
European Search Report Serial No. 05712031.3, dated May 31, 2011.
China Patent Office, "Notification to Grant Patent Right for Invention", mailed Oct. 20, 2011; Appln. No. 200580010356.2.
USPTO "Non-Final Office Action" mailed Oct. 28, 2011; U.S. Appl. No. 11/059,059, filed Feb. 16, 2005.
Korean Notice of Final Rejection, dated Dec. 21, 2011, for Korean Patent Application No. 10-2006-7015425.
Translation of Korean Notice of Final Rejection, dated Dec. 21, 2011, for Korean Patent Application No. 10-2006-7015425.
Japanese Patent Office, Office Action for Japanese Patent Application No. P2010-246303, dated Jun. 19, 2012.
USPTO "Notice of Allowance" mailed May 2, 2012; U.S. Appl. No. 11/059,059, filed Feb. 16, 2005.

\* cited by examiner

METHOD AND APPARATUS FOR INITIATING ONE-DIMENSIONAL SIGNALS WITH A TWO-DIMENSIONAL POINTING DEVICE

CROSS-REFERENCE TO RELATED APPLICATIONS

This is a division of U.S. application Ser. No. 11/045,263, pending, filed Jan. 27, 2005, which claims the benefit of U.S. Provisional Application No. 60/540,534, filed Jan. 29, 2004, which are both incorporated herein by reference.

TECHNICAL FIELD

The invention relates to using a two-dimensional pointing device to produce one-dimensional data such as scrolling information.

BACKGROUND

The graphical user interface (GUI) has become the standard paradigm for human interaction with personal computers. A GUI consists of a screen for displaying graphical elements and a pointing device for pointing at and selecting these elements. One of the most standard of GUI graphical elements is the scrollbar. Scrollbars are used for bringing particular sections of a large document into view on a display screen that is too small to view the entire document at once. Almost all programs for navigating documents incorporate a vertical scrollbar and most contain a horizontal scrollbar.

Although scrollbars have become the standard mechanism for navigating large documents, using them requires a significant level of attention and dexterity. And since scrolling is such a commonly performed function, newer systems have incorporated schemes for affecting scrolling without the need for visual interaction with scrollbars. The most widely deployed device for easing the scrolling task is the wheel mouse. The wheel mouse augments the pointing function of the standard computer mouse with a detented wheel typically mounted between the left and right buttons. Most current GUI systems will use the signals produced by rotation of this wheel to vertically scroll the document with the current keyboard focus or the document lying under the display cursor.

One problem with a typical mouse wheel, of course, is that only vertical scrolling is supported. Another problem with the scheme is that in the typical configuration, the wheel can only be slowly rotated, making it marginally useful for scrolling large distances. Lastly, portable systems often incorporate pointing devices other than a mouse so a more universal scrolling acceleration mechanism is desirable.

Various attempts have been made to perform scrolling functions using a touchpad-type device. One technique, for example, uses a touchpad to perform both pointing and "virtual" scrolling functions using regions at the right and bottom of the pad dedicated to vertical and horizontal scrolling, respectively. When a finger lands in one of the scrolling regions and stays within that region, special software generates scrolling information instead of the normal pointing information. Pointing functionality is restored by moving the finger out of the scrolling region with or without an intervening lifting of the finger from the pad. An exemplary implementation of scrolling performed on a touchpad device is described in U.S. Pat. No. 5,943,052.

Touchpad virtual scrolling is a fairly natural solution to the problem of easing both vertical and horizontal scrolling but it frequently suffers from the same problem as the wheel mouse, in that scrolling large distances can be inefficient. One way of alleviating this problem, called coasting, attempts to remedy this issue. Typically, a user activates a coasting feature by initiating scrolling and then having the finger leave the pad while the finger velocity parallel to the scrolling region is still high. When coasting is activated, the touchpad subsystem typically generates a continuous stream of scrolling signals which is interruptible by again touching the pad. U.S. Pat. No. 5,943,052 also shows an exemplary coasting implementation.

While coasting can be used to scroll long distances fairly quickly, many implementations can require considerable dexterity to use efficiently. Further, each user typically adjusts the coasting rate to match their personal preference, and any such preference might only work well for some document types.

Another technique for scrolling uses a portion of a pen-type touchpad as a "jog dial" where pen motion around the center of the dial is used to generate scrolling signals. Typically, the rate of generation of scrolling signals is proportional to the rate of angle subtended by the pen as it moves around the center of the dial. A further refinement allows the center point used in the subtended angle calculation to move and thereby follow freeform circular pen motions.

Jog dial scrolling can be a significant improvement over a mouse wheel or touchpad virtual scrolling for moving large distances within a document. However, the idea of a jog dial is conceptually distinct from that of a linear scroll bar and therefore training naïve users in its use is non-trivial. The particular embodiment described in the jog-dial patent placed the touchpad over a display screen so that the jog-dial could be displayed under the pad.

Touchpad virtual scrolling is a good conceptual mapping between GUI scrollbars and the dedicated touchpad present in the majority of today's portable computers. While the jog dial provides some benefits over current touchpad scrolling implementations, the jog dial is conceptually distinct from linear scrollbars, and can therefore require significant acclimation for naïve users. What is therefore needed is a method and a system for generating scrolling signals that is conceptually compatible with linear scrollbars but that provides improved sensitivity and dynamic range. Furthermore, other desirable features and characteristics will become apparent from the subsequent detailed description and the appended claims, taken in conjunction with the accompanying drawing figures and the foregoing technical field and background.

SUMMARY

Methods and systems for using a two-dimensional computer pointing device to generate one-dimensional input such as scrolling signals are provided. According to various exemplary embodiments, one-dimensional signals suitable for scrolling or other user interface functions on a computing device are provided in response to two-dimensional inputs produced by a touchpad or other input device. The user initially touches the touch sensor in an area near a periphery of the touch sensor and moves his or her finger along the periphery of the device, and then provides a subsequent motion of the finger across the touch sensor in a direction that departs from the periphery. The amount of scrolling produced on the computing system may be determined as a function of a distance moved by the user's finger. Alternate and additional features of various exemplary embodiments are described in detail below.

BRIEF DESCRIPTION OF THE DRAWING FIGURES

Exemplary embodiments of the invention will hereinafter be described in conjunction with the following drawing figures, wherein like numerals denote like elements, and FIG. 1 shows an exemplary technique for converting two-dimensional pointing information to one-dimensional scrolling information.

DETAILED DESCRIPTION

Figure 1:
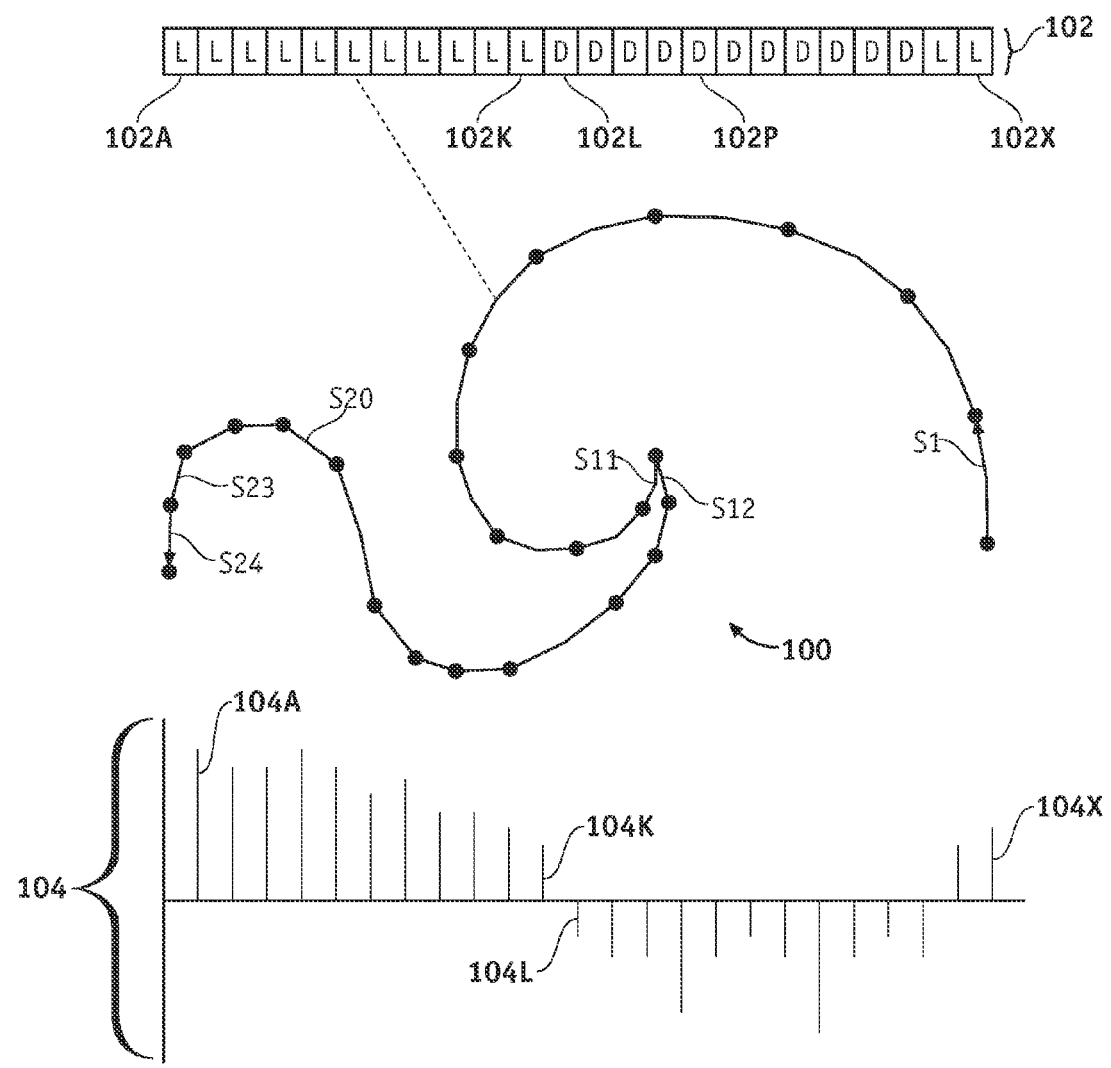

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In an exemplary embodiment, once a one-dimensional mode has been entered, two-dimensional paths that turn largely to the left generate one-dimensional signals of one polarity. Two-dimensional paths that turn largely to the right generate one-dimensional signals of the opposite polarity. Polarity can be reversed by abruptly reversing direction or by turning sufficiently in the opposing direction from the currently preferred direction. The magnitude of the generated one-dimensional signals is suitably proportional to the length of the two-dimensional path traveled.

Various methods for entering a one-dimensional input mode are also described. One exemplary method enters a vertical scrolling mode when a pointing device is initially approached in an area adjacent to its rightmost edge and the initial motion across the device is parallel to this edge. Another method enters horizontal scrolling mode under similar approach and parallel movement within an area adjacent to a device's bottommost edge. A further refinement enters horizontal scrolling mode only if the initial velocity of parallel motion is less than a threshold velocity.

When used with computer touchpads, various techniques described herein can be conceptualized as an extension of linear scrolling. Scrolling short distances can be accomplished by moving linearly within regions adjacent to the touchpad's periphery. Departing from the periphery and moving in curvilinear paths accomplishes long distance scrolling. The various concepts, techniques, systems and structures described herein may be incorporated into any type of pointing or other input device, including any type of touchpad or other device capable of sensing the actual or relative position, proximity, motion, acceleration, or other positional information. These and other aspects of various exemplary embodiments are described more fully below.

Scrolling becomes particularly important when a graphical user interface is constrained in one dimension but unconstrained in another. The common situation is that the constrained dimension generally fits entirely on the computer display while only some portion of the unconstrained dimension is in the same view. Because of the left to right reading order of many languages it is more common for the vertical dimension to be unconstrained than the horizontal. For example a document-editing program may present a document as a sequence of contiguous pages laid out vertically one after another.

It is a conventional responsibility of the scrolling function to allow rapid navigation within this linear space of lines and pages. Because documents may contain many hundreds of pages each containing many tens of lines, of which only a portion may be visible at any given time, a highly desirable feature for the scrolling function is a large dynamic range. In other words, it is desirable that a good scrolling mechanism be able to scroll small distances with fine control as well as cover large distances quite rapidly.

While users generally prefer to associate the scrolling operation with the computer's pointing device, the typical dynamic range requirement for scrolling is quite at odds with the two-dimensional task normally associated with pointing devices of moving a point of attention, or cursor, around a fixed sized two-dimensional display universe. Commonly available pointing devices are, of course, optimized for the pointing task. The specialization is so pronounced that the scrolling task is often subsumed by separate hardware, for example the mouse wheel, which is merely proximity associated with the main pointing function.

This dichotomy is somewhat surprising given that pointing task is generally accepted to be more nuanced than the scrolling task. The essence of the problem of applying a two-dimensional pointing device to scrolling is to establish an intuitive mapping between a fixed sized two-dimensional pointing space and an essentially infinite one-dimensional scrolling space. One way of thinking about this is that the potentially infinite scrolling space is "folded up" so that it fits within the fixed size two-dimensional space. Or thinking backwards, a folded up two-dimensional path is unwound and laid along a single dimension.

Ideally this two-dimensional to one-dimensional mapping would require only local information, for instance, the distance and direction of recent excursions. A proper local mapping is applicable to absolute mode devices such as touchpads as well as relative mode devices such as mice. Ideally as well, the mapping should be as general as possible, accepting a wide variety of two-dimensional paths. In particular the ideal mapping should accept both linear and circular paths, as linear motions are generally considered to be natural for small excursions and circular motions are generally considered to be efficient for traveling longer distances. The chiral path mapping of the next section is a natural way of meeting both these parameters.

Chiral Paths

A chiral path is a discrete path through two-dimensional space wherein each segment along the path is labeled with one of two possible chiralities. The chirality of a segment is designated by a predominant or "preferred" turn direction. Adapting terminology from organic chemistry for use herein, a levorotary (L) segment is generally part of a left hand turning sequence. A dextrorotary (D) segment is generally turning largely to the right. For example, if circular path is traversed counterclockwise (CCW), its segments are L, or if traversed clockwise, D.

Once the segments of a chiral path have labeled, it is straightforward to map the path onto a one-dimensional output variable. Chirality serves to establish the sign of the output and the distance traveled serves to establish the magnitude. By convention, L segments produce positive outputs and D paths negative, although other embodiments may use the opposite and/or any other scheme. Deriving the output magnitude from the input path length allows the full dynamic range of the two-dimensional pointing device to be brought to bear on any associated one-dimensional task.

FIG. 1 shows an example chiral path 100 with twenty-four input segments S1-S24. Chirality labels 102A-X for each segment S1-S24 are listed in the row at the top of the figure. Exemplary mapped one-dimensional output variables 104A-X are graphed at the bottom of the figure. The magnitude of each output variable 104A-X is shown to be proportional to the length of a corresponding input segment S1-S24 and its sign is determined from the chirality 102A-X of the input segment. Note that though the two-dimensional path 100 shown in FIG. 1 largely progresses from right to left, the corresponding chirality labels 102 and output graph 104 are written from left to right.

Path Segment Labeling

Establishing a chiral path labeling that is both efficient for one-dimensional user input tasks and naturally comfortable and intuitive is a key challenge. For efficiency reasons it is desirable that abrupt two-dimensional direction reversals reliably generate chirality reversals and corresponding output variable sign changes. The abrupt reversal occurring between segments S11 and S12 in FIG. 1, for example, causes a change in current chirality 102 from "levorotary" to "dextrorotary" (as seen in 102K versus 102L) and a corresponding change in the sign of output variable 104 (as shown in 104K versus 104L). However, it is also desirable that not so abrupt reversals not produce chirality reversals so that the desired goal of generating an essentially "infinite" output variable from the finite two-dimensional space can be accomplished. These competing requirements together with typical user impreciseness of matching actual input with intended action and additional vagaries introduced by imperfections in the pointing device itself make problematic a perfect matching of user intent from purely local trajectory information.

Fortunately, small inaccuracies in local chirality tracking are acceptable for the majority of one-dimensional user interface tasks. However, the typical user expectation is that a sustained precession in a particular direction must reliably align chirality labeling 102 with the preferred turn direction. Any transient chirality misalignment should be corrected relatively quickly with minimal output magnitudes 104 during misalignment.

Chirality Estimation Via Approximate Heading Tracking

Figure 2:
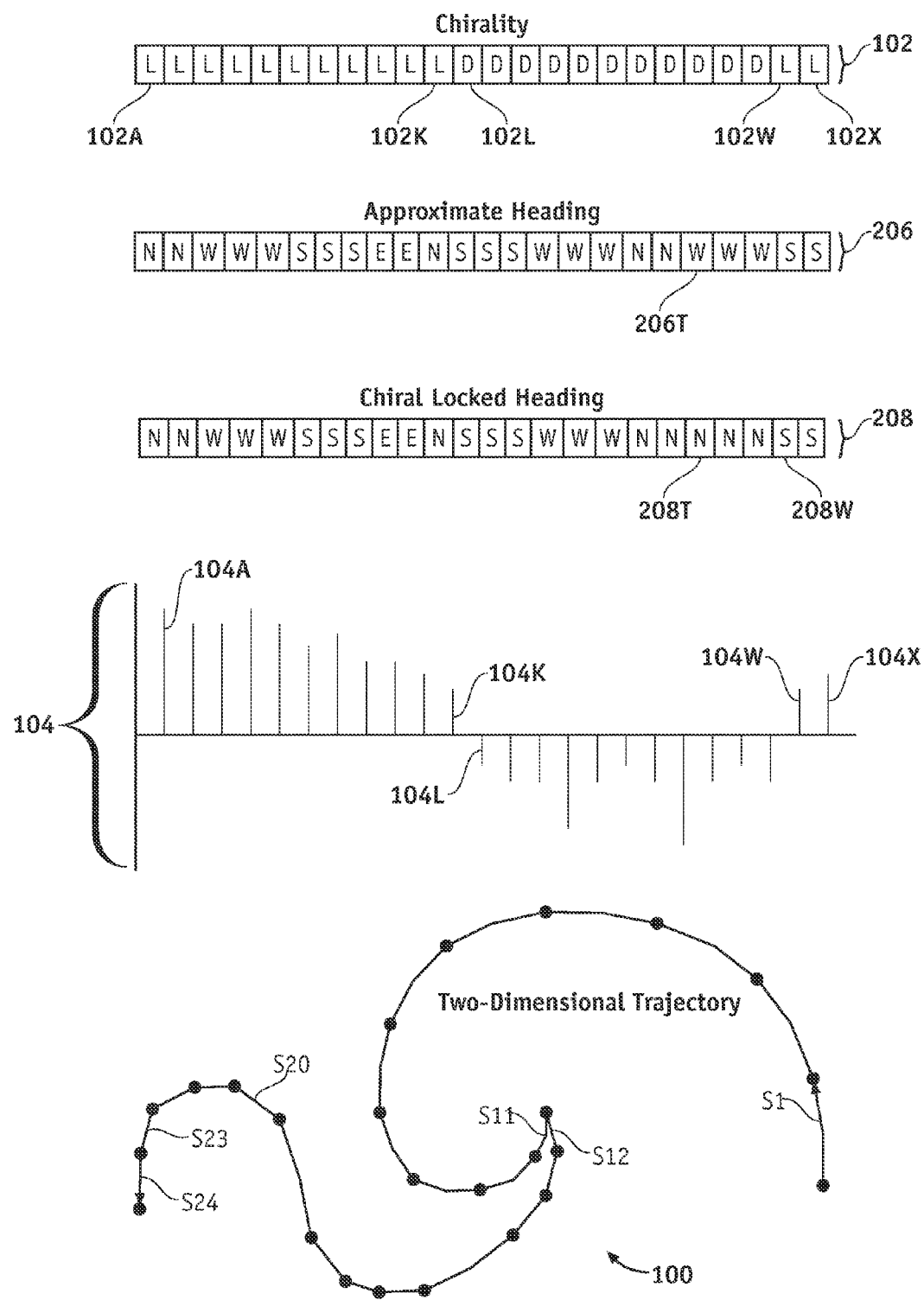
FIG. 2 shows an exemplary technique for maintaining the current chirality of a chiral path via a chiral-locked approximate heading.

With reference now to FIG. 2, one method for generating chirality labels 102 that successfully satisfies competing requirements while remaining computationally simple is based upon local tracking of a relatively coarse approximate heading 206 of path 100. In this scheme, a maintained approximate heading is allowed to take on only certain subsequent values or "buckets" based upon the currently-favored chirality. Precession of an approximate heading from one bucket to another adjacent bucket in the direction of the currently favored chirality therefore maintains the current chirality labeling for subsequent processing.

The same basic mechanism can be used to correct potential local chirality inaccuracies by allowing an approximate heading to precess only in the direction of the currently preferred chirality. Using this chirality locking, sequences of trajectory segments that span two largely opposing buckets but that contain substantial digression into intervening buckets in the opposing direction of the current chirality also signal a chirality reversal. In essence any trajectory that causes an abrupt change in a chirality locked approximate heading is a signal to reverse the current polarity of chirality labeling. That is, as the actual heading 206 of path 100 precesses toward a direction that is inconsistent with the currently chirality, the subsequent chirality 208 is "locked" at the last consistent value.

An example of approximate heading chirality labeling using four approximate compass-aligned headings ("N", "S", "E" and "W") is shown in FIG. 2. An exemplary trajectory begins to the north near the right edge of the figure. Corresponding approximate headings and chirality labels are written from left to right at the top of the figure. Although this example uses four buckets named for the four cardinal directions for convenience, alternate embodiments may use any number of buckets or categories that may be arranged or referenced in any manner.

The initial path segment in FIG. 2, S1, is counter-clockwise (or "levorotary", indicated by "L"), corresponding for example, to vertical scrolling initiated from the rightmost edge of a touchpad. As the direction of the path progresses from north to west to south to east to north, the approximate heading, shown in the first row of the figure, precesses with it. An abrupt reversal in direction (north to south) occurs between segments S11 and S12 generating a corresponding chirality 102 and output sign reversal as described above. With the preferred chirality beginning with segment S12 now clockwise (or "dextrorotary", indicated by "D"), the approximate heading now precesses from south to west to north to west. However, since the locked heading 208 will not precess in the L direction, it does not make the last progression from north to west. This locking occurs because northerly to westerly movement, while not an abrupt "reversal" as described above, is inconsistent with the currently-preferred "D" chirality. When the approximate heading then progresses to S at segment S23, the locked heading 208 (still N) makes a complete reversal at 208W resulting in a chirality 102 change and an output variable 104 sign reversal. To summarize, progression of an approximate heading 206 between two largely opposing buckets without substantial digression into intervening buckets (e.g. northerly to southerly) suitably indicates an abrupt trajectory reversal, whereas progression of locked heading 208 between opposing buckets suitably indicates a gradual trajectory reversal and a corresponding change in chirality 102.

Four Quadrant Chiral Sensing

A flowchart for an exemplary four approximate direction chirality sensing method as described above is shown in FIG. 3. This method ("ChiralSense") takes as its input the distance traveled in the x and y directions since the last motion report obtained from a position sensor or the like. Depending upon the current approximate heading, the component of travel in the direction of the heading bucket is examined. If this component is sufficiently in opposition to the current approximate heading, the current chirality and heading bucket are reversed. Otherwise, if the direction of travel is sufficiently more aligned with the chirally adjacent approximate heading than with the current approximate heading then the approximate heading is allowed to precess. Note that the order of comparison allows the approximate heading to either reverse or to precess in the direction of the current chirality. Precession in the opposing direction to the current chirality is not allowed. The various processing parameters (e.g. "Q", "I") shown in FIG. 3 are described more fully below in Tables 1 and 2.

Figure 3:
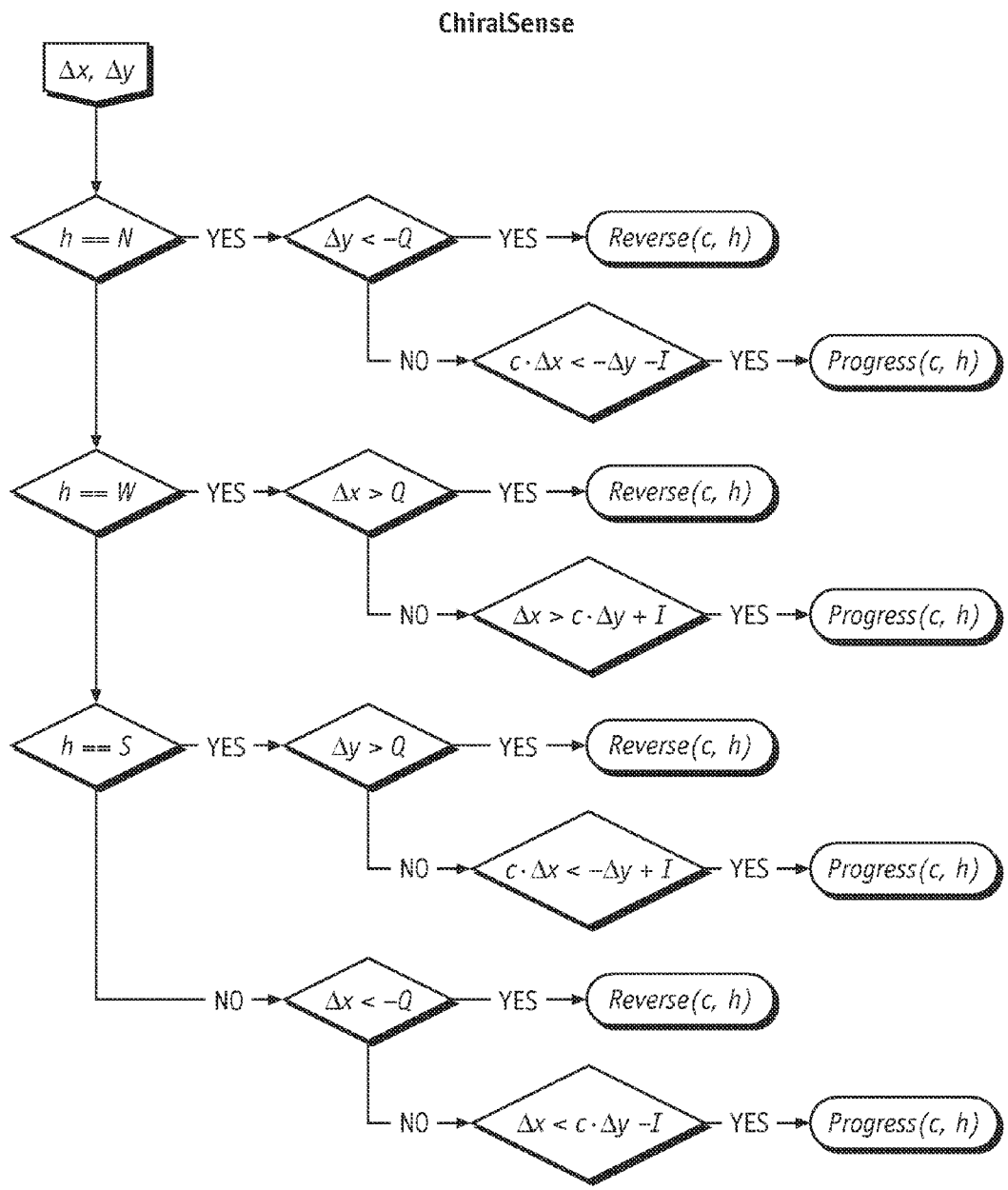
FIG. 3 is a flow chart of an exemplary technique for maintaining the chiral state.
Figure 4:
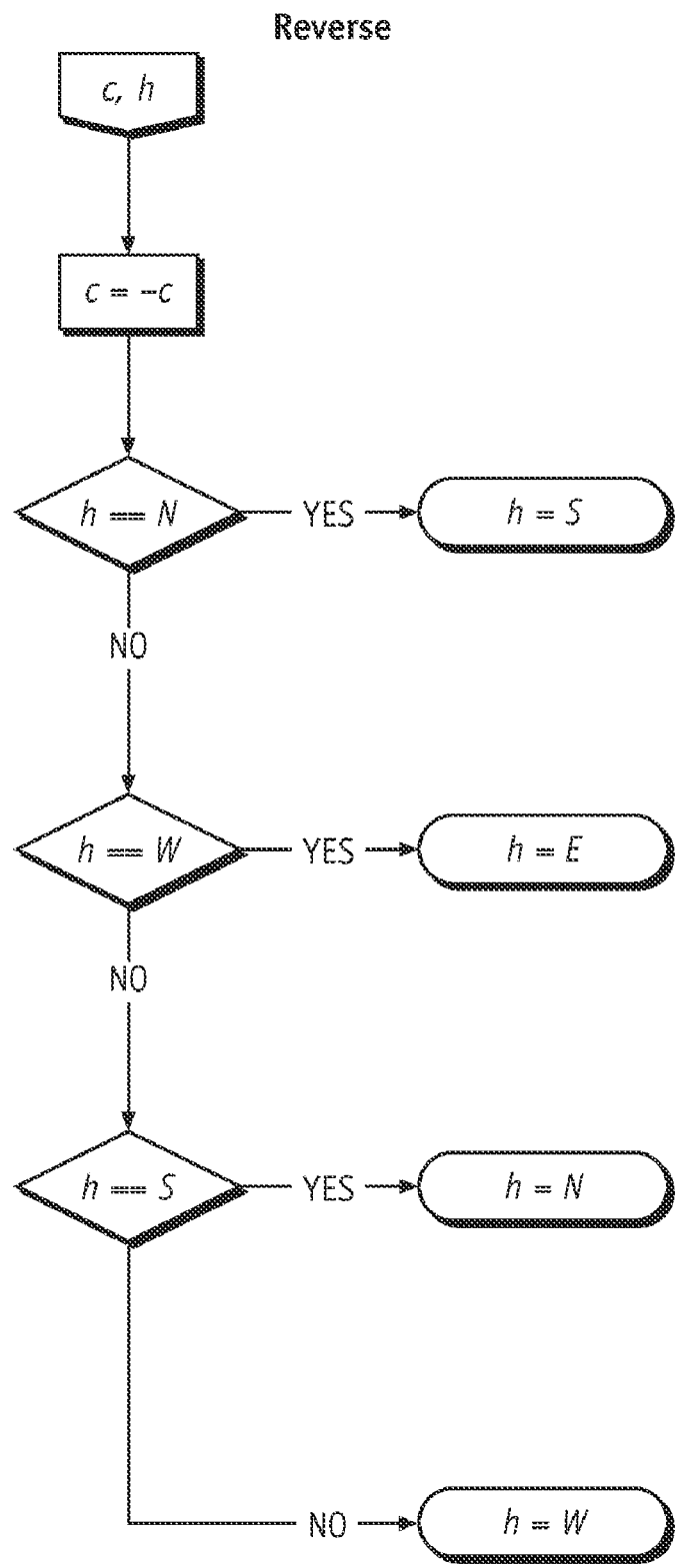
FIG. 4 is a flow chart of an exemplary technique for reversing the direction of an approximate heading.

An exemplary "Reverse" function compatible with the chirality sense function of FIG. 3 is shown in FIG. 4. This Reverse function inverts the current chirality and approximate heading as appropriate. First, the sign of the chirality state variable, c, is inverted. Next, the state variable containing the current approximate heading, h, is updated with the direction of travel opposing the current direction.

Figure 5:
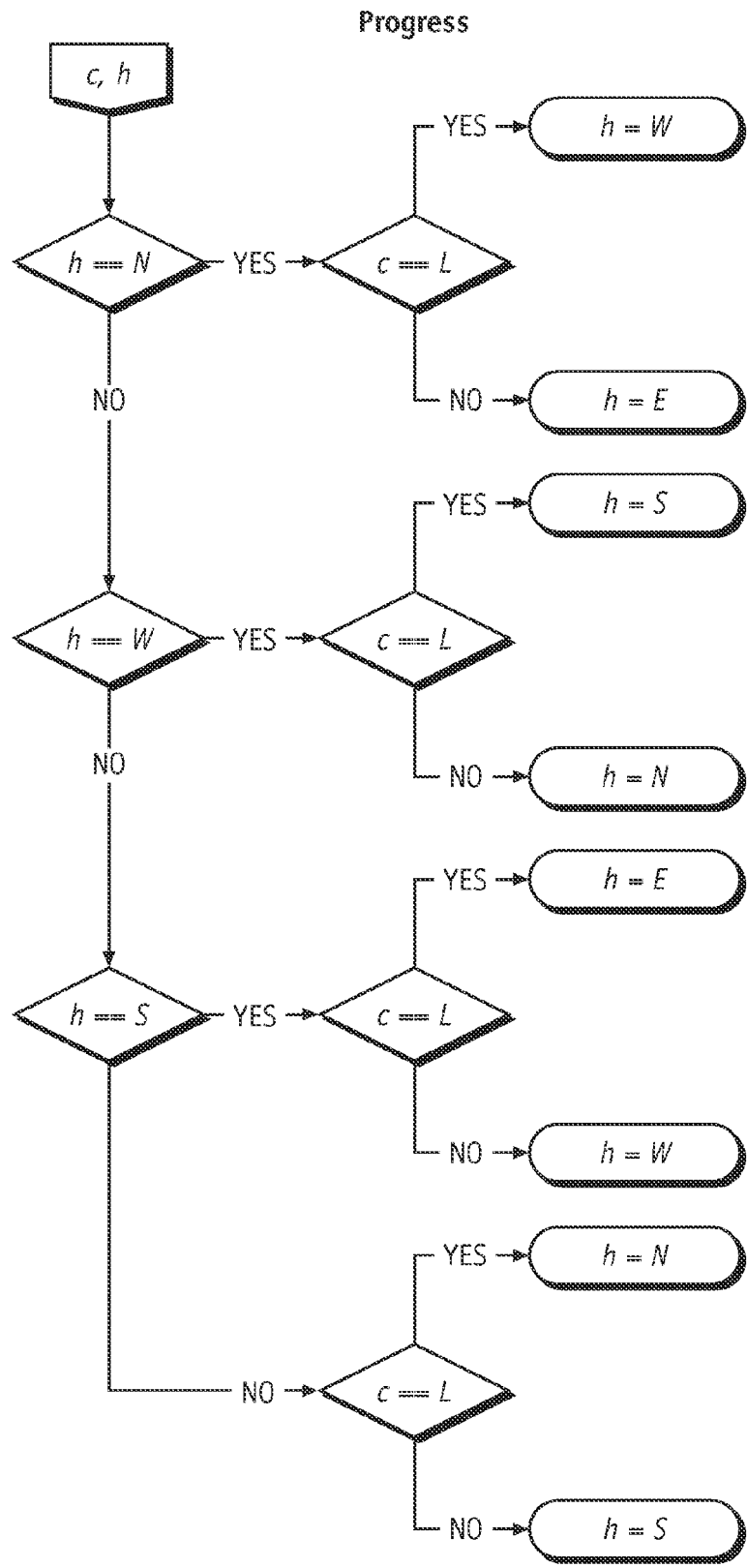
FIG. 5 is a flow chart showing an exemplary technique for allowing an approximate heading to precess only in the direction aligned with the chiral state.

FIG. 5 similarly shows an exemplary "Progress" function that is compatible with the chirality sense function shown in FIG. 3. The Progress function of FIG. 5 precesses the current approximation heading in the direction of the current chirality. First, the current heading bucket is used to select from either of its adjacent buckets. Next, the current chirality is used to select the adjacent bucket that is towards the preferred direction of precession.

FIGS. 3-5 show one exemplary technique for determining a current chirality based upon information derived from motion reports obtained from a position sensor or the like. Various equivalent embodiments, however, may use widely varying routines to implement similar concepts.

Output Variable Accumulation

Because the space spanned by a chiral mapped output variable can be quite large, it is desirable for the mechanism used to generate it to cover a wide dynamic range. Since typical two-dimensional pointing devices already have a wide dynamic range it is desirable to derive the output variable magnitude from input distance traveled. One simple way to accomplish this is to sum magnitudes of input motion reports into an output accumulator. The particular magnitude function used is not critical. Euclidian and rectilinear measures yield similar results.

A scheme that improves on simple distance measures takes advantage of the known approximate heading used for chiral sign management. The basic idea is that distance accumulated should be biased toward distance traveled in the direction of the current approximate heading. A simple way of accomplishing this is to accumulate the dot product of the current approximate heading with the current input path segment.

The dot product improves on standard distance functions in two ways. First, if chirality is temporarily misaligned with the user's intent, accumulating the dot product helps to minimize the magnitude of the output variable during misalignment. For example, segments S21-S23 on FIG. 2 correspond to largely westward movement 206. However, previous movements have resulted in a dextrorotary chirality lock 208 preventing the approximate heading from precessing beyond north even as movements tend largely westward. Since the northward approximate heading vector produces a relatively small dot product with largely western path segments, the accumulated output during the interval where direction changes from north to south is minimized. Fortuitously, this interval generally corresponds to the period where the user's intent is ambiguous.

A second benefit of the dot product applies to relatively noisy input devices such as touchpads. When the user momentarily dwells at a single position, two-dimensional input deltas may fluctuate about zero simply due to environmental disturbances or imperfections in the measurement apparatus. Since the dot product is a signed quantity, excursions due to input noise tend to cancel when they are summed in the output accumulator.

Figure 6:
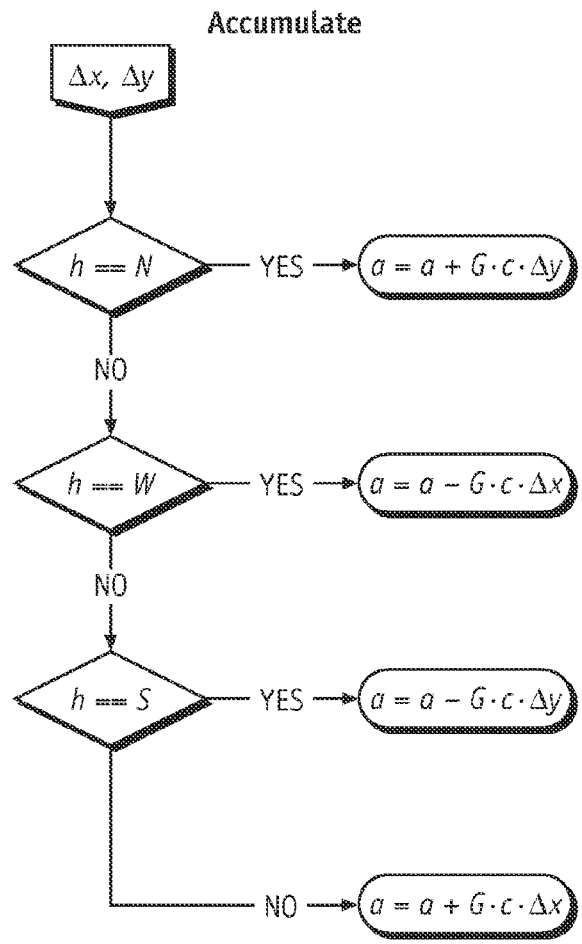
FIG. 6 is a flow chart showing an exemplary technique for accumulating fractional scrolling information from an approximate chiral path length.

FIG. 6 is a flow chart for one technique suitable for accumulating approximate heading dot products. Since approximate headings can be defined to be axially aligned, dot products can be formed by simply selecting proper input components. The current approximate heading is used to select which input component and sign to use. A basic gain factor, G, can also be applied during accumulation. Note that the sign of the accumulated value is dependent upon both the current chirality and the sign of accumulated input components.

Integral Output Unit Extraction

For many input devices if the smallest resolvable input movement were to generate a single unit of output motion, then the output speed would be far higher than that useful in actual practice. For these devices it is useful to accumulate fractional output units until such time as an integral unit becomes available. As they become available, integral units are extracted from the output accumulator for delivery to the scrolling backend and the residual fraction is retained.

Figure 7:
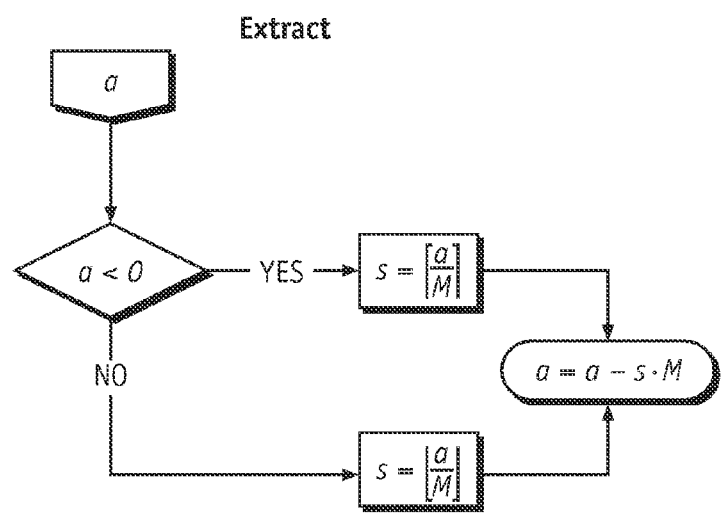
FIG. 7 is a flow chart of an exemplary technique for extracting integral scrolling units from fractional scrolling information.

FIG. 7 shows a flow chart for one technique suitable for extracting integral units from a fractional accumulator. The sign of the accumulator is examined to determine how many integral units it contains. If positive, the floor of the accumulator divided by the fractional denominator is extracted. If negative, the ceiling of the quotient is extracted. The extracted portion multiplied by the fractional divisor is subtracted from the accumulator leaving a fractional remainder. Alternate embodiments may use other techniques for extracting the one-dimensional signals from the accumulator.

Non-linear Output Ballistics

Figure 8:
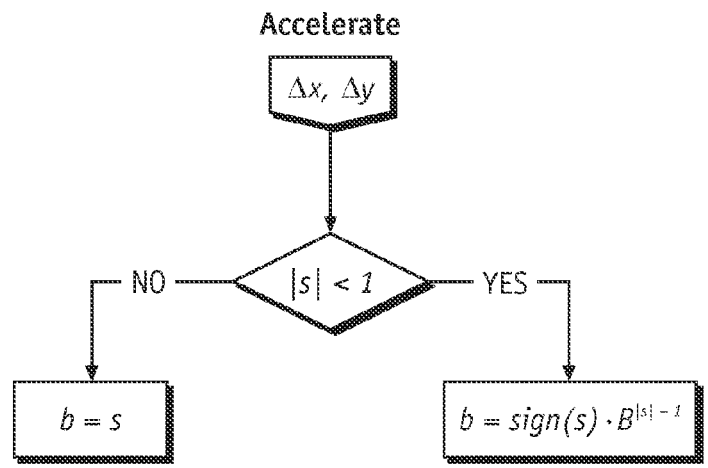
FIG. 8 is a flow chart showing an exemplary technique for non-linear expansion of the dynamic range of extracted scrolling units.

One technique for expanding the dynamic range of a variable is non-linear expansion. A non-linear mapping function maps a range of input values to a larger range of output values. FIG. 8 shows an exponential non-linear mapping function that is designed for use with integer inputs. If the input is zero, the output is zero. Otherwise the output is the sign of the input multiplied by a base raised to one less than the magnitude of the input. When applied to variables associated with motion of user input elements, non-linear expansion functions are sometimes referred to as ballistics functions. This particular ballistics function is potentially quite expansive and can be used when very large output spaces must be navigated. Ballistics functions may vary significantly from implementation to implementation, however, and may not be required in all embodiments.

Exemplary Embodiment for Chiral Scrolling

Figure 9:
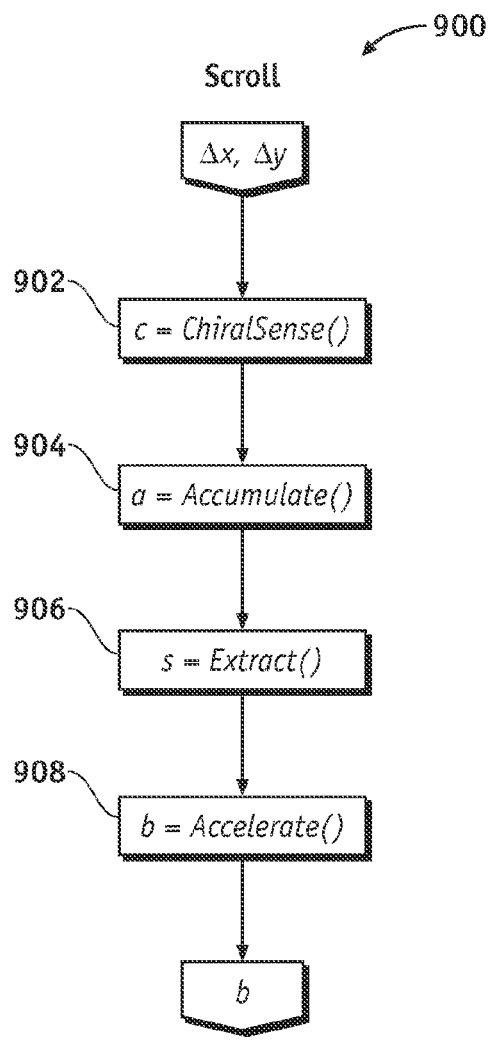
FIG. 9 is a flowchart showing an exemplary overall flow of translating relative changes in two pointing dimensions into scrolling units.

FIG. 9 shows an exemplary method 900 for generating a one-dimensional output variable suitable for scrolling from input motions on a laptop computer touchpad or other device. First, the chirality sensing function 902 establishes the direction of scrolling indicated by the one-dimensional output 104 discussed above. Fractional output units are then accumulated via an accumulate function 904, followed by extraction of integral output units using an extract function 906. Finally, a ballistics function 908 expands the dynamic range of the output variable to that suitable for scrolling.

Chirality-sensing function 902, accumulation function 904, extraction function 906 and ballistics function 908 are performed using the techniques set forth in FIGS. 3-8 above. Alternatively, some or all of functions 902-908 may be implemented with alternate or additional techniques. The following tables show exemplary variables used to represent the various states used in one embodiment of method 900.

TABLE 1

| State Variable | Description |
| --- | --- |
| c | Current chirality: L, D |
| h | Current approximate heading: N, W, S, E |
| a | Accumulated output variable |
| s | Integral portion of accumulated output variable |
| b | Ballistics adjusted output variable used for scrolling |

TABLE 2

| Parameter | Description | Exemplary Value |
| --- | --- | --- |
| I | Heading progression noise parameter | 2 |
| Q | Heading reversal noise parameter | 2 |
| G | Output fractional accumulator gain | 768 |
| M | Fractional base of output accumulator | 65536 |
| B | Base for exponential output variable ballistics | 2 |

Table 1 summarizes state variables maintained by the various sub-functions of the method 900 of FIG. 9. Table 2 shows exemplary values for the various free parameters when the method is used with a CPAD brand touchpad product available from SYNAPTICS INC. of San Jose, Calif., although these parameters may vary significantly in alternate embodiments. While FIG. 9 refers to scrolling in a single direction, in practice the same method can be used to generate both vertical and horizontal scrolling units. Exemplary methods for determining which axis to scroll are described in the following sections.

Modal Intent

A device that time multiplexes identical hardware onto conceptually separate tasks is often called a modal device. Each task required of a modal device is accomplished by first entering a separate mode of operation. The set of operations that is performed to enter a particular mode is called a modal entry signature.

A key problem in devising modal signatures is to naturally and reliably separate the different functions performed by the device. A natural modal signature is one that smoothly blends from entering a particular mode to performing the task associated with that mode. A reliable modal signature is one that is never or very infrequently confused with normal activity in another mode.

Because a single mode of operation is often preferred out of several available, the preferred operation often is assigned a fairly trivial modal entry signature. That is, the most-commonly used mode is typically assigned a modal entry signature that is relatively easy for the user to perform. The preferred mode of operation is called the home mode and its modal entry signature is called the homing signature. As with any modal entry signature a homing signature is desired to be both natural and reliable.

Modal Signatures for Touchpad Scrolling

An extremely reliable touchpad homing signature is the removal of the finger or stylus from the pad. When paired with chiral scrolling techniques, this signature is particularly natural. Each time the pad is approached, pointing is the default operation. Once a scrolling mode has been entered, that mode suitably persists until the finger leaves the pad.

Figure 10:
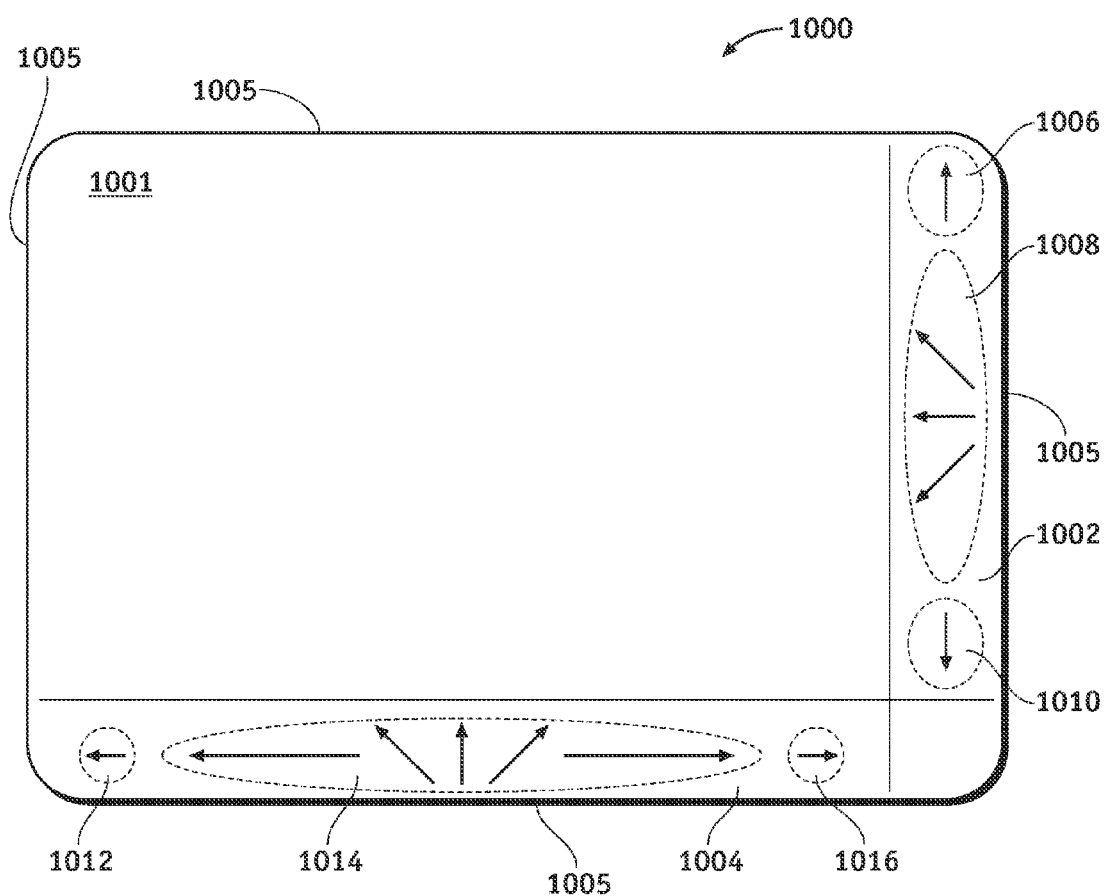
FIG. 10 shows exemplary discrimination signatures for separating pointing from scrolling.

Exemplary horizontal and vertical scrolling entry signatures suitable for use with a rectangular touchpad 1000 are shown in FIG. 10. In the figure, the first portion of a scrolling entry signature is the landing zone, the area of initial approach to the pad. The second portion of a signature is the initial direction of movement. The third portion is the initial velocity of movement.

In FIG. 10, the pad perimeter 1005 and adjacent solid lines drawn in the interior delineate exemplary landing zones 1002 and 1004. Solid lines with arrows indicate potential initial movement directions that are represented as vectors. Arrow length for each vector indicates initial velocity, and arrow direction indicates direction of movement. In the embodiment shown in FIG. 10, only some initial movement directions and velocities are valid within a scrolling entry signature. The vectors valid for scrolling are shown in FIG. 10 as vectors 1006, 1010, 1012 and 1016. Vectors defaulting to pointing intent are grouped as vectors 1008 and 1014. FIG. 10 illustrates one embodiment, and alternate embodiments may differ significantly.

For vertical scrolling the natural landing zone 1002 is close to the rightmost periphery 1005 as this location maps nicely to the default location of scrollbars on a computer display. The natural initial direction of motion to indicate vertical scrolling is parallel to the right edge, as in vectors 1006 and 1010. Because this combination of events is rarely used for pointing, it is typically unnecessary to place an initial velocity constraint on a vertical scrolling entry signature. Therefore in FIG. 10, all properly oriented initial motion vectors 1006 and 1010 may be marked as admissible, regardless of the initial velocity, in various embodiments. Similarly, other vectors 1008 (e.g. vectors pointing away from the periphery 1005) may be marked as inadmissible.

For horizontal scrolling, the natural landing zone 1004 is at the bottommost periphery 1005 and the natural initial direction of motion is parallel to that edge. Because rapid motion parallel to a pad's bottom edge is often associated with pointing intent, a reliable horizontal entry signature may also include an initial velocity constraint. In FIG. 10, for example, only shorter and properly oriented vectors (e.g. vectors 1012 and 1016) are admissible for scrolling. Longer vectors, indicating larger initial velocities, are likely to be associated with pointing and as such are included within inadmissible vectors 1014.

Touchpad Modal Signature Detection

Figure 11:
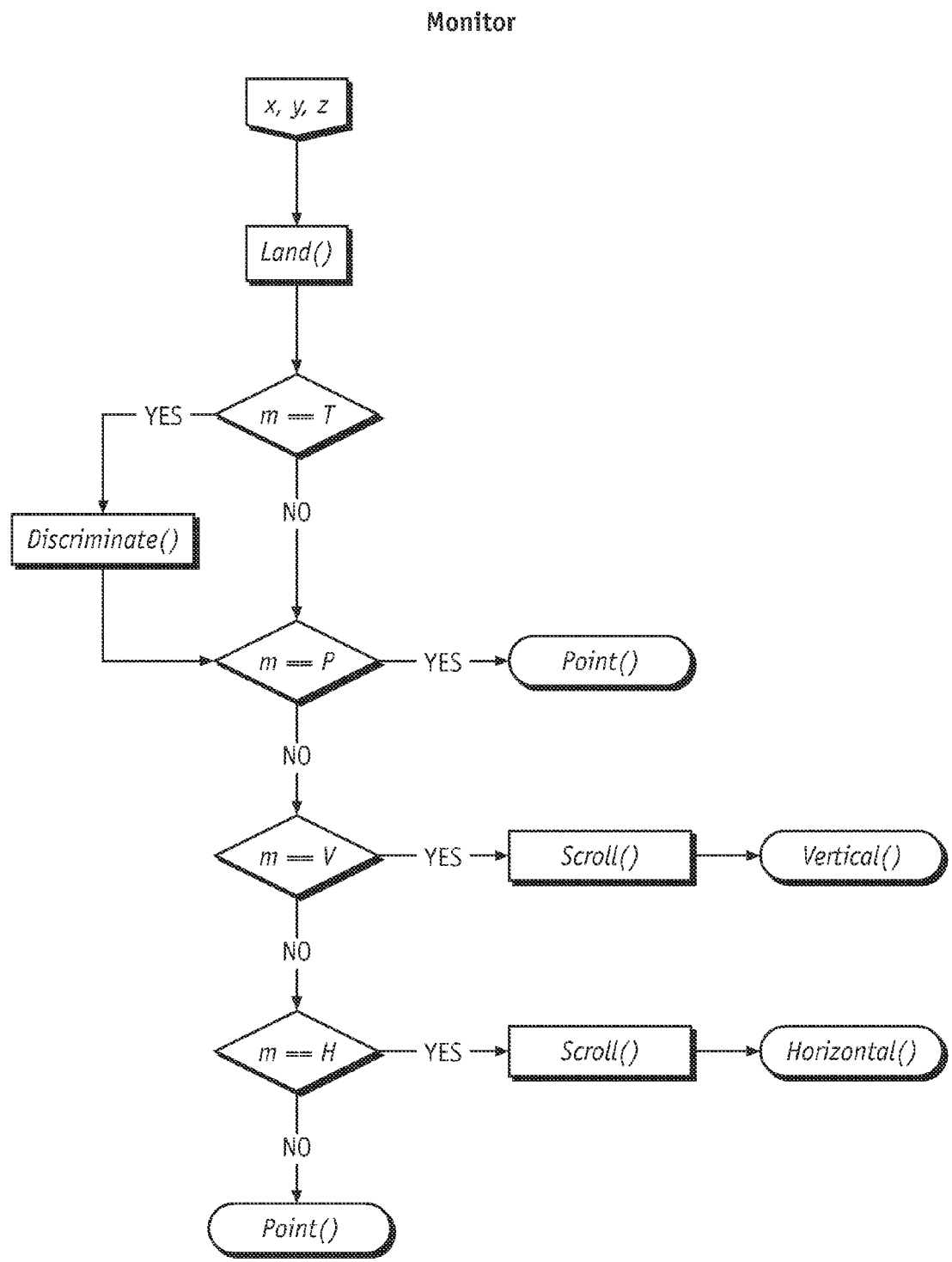
FIG. 11 is a flow chart showing an exemplary technique for using the initial location of a pointing instrument in a manner that is tentatively acceptable for scrolling.

FIG. 11 shows an exemplary technique for examining the input stream from an absolute mode touchpad and extracting modal entry signatures. Depending upon the value of a state variable, a position report is dispatched for either pointing or scrolling. Reports dispatched for scrolling are first passed through a Scroll( ) method such as that of FIG. 9 in order to convert the available two-dimensional position information into a one-dimensional variable suitable for scrolling. The Point( ), ScrollHorizontal( ), and ScrollVertical( ) methods of FIG. 11 represent exemplary modal dispatch routines, and may be implemented using any conventional routines to accomplish pointing, horizontal scrolling, and vertical scrolling, respectively.

Figure 12:
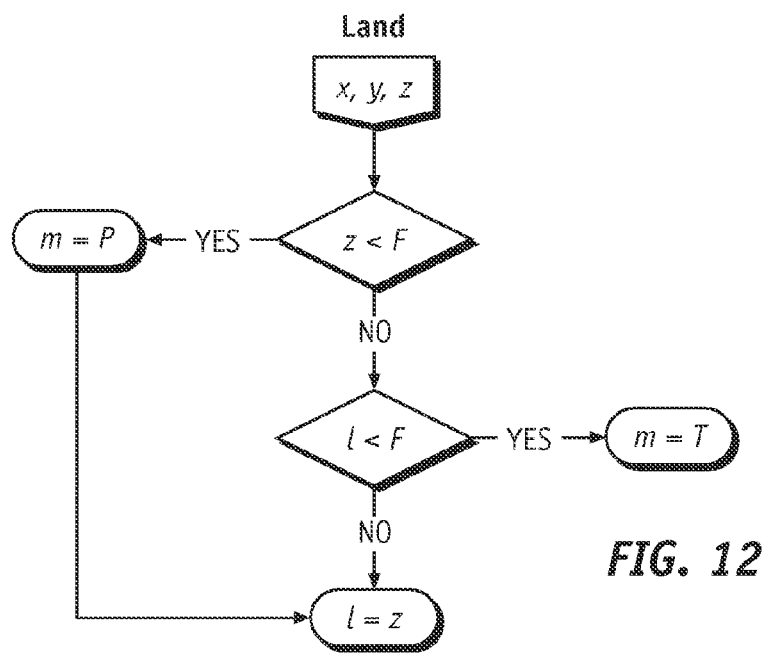
FIG. 12 is a flow chart showing an exemplary technique for discriminating pointing intent from scrolling intent using the initial speed and trajectory of a pointing instrument.
Figure 13:
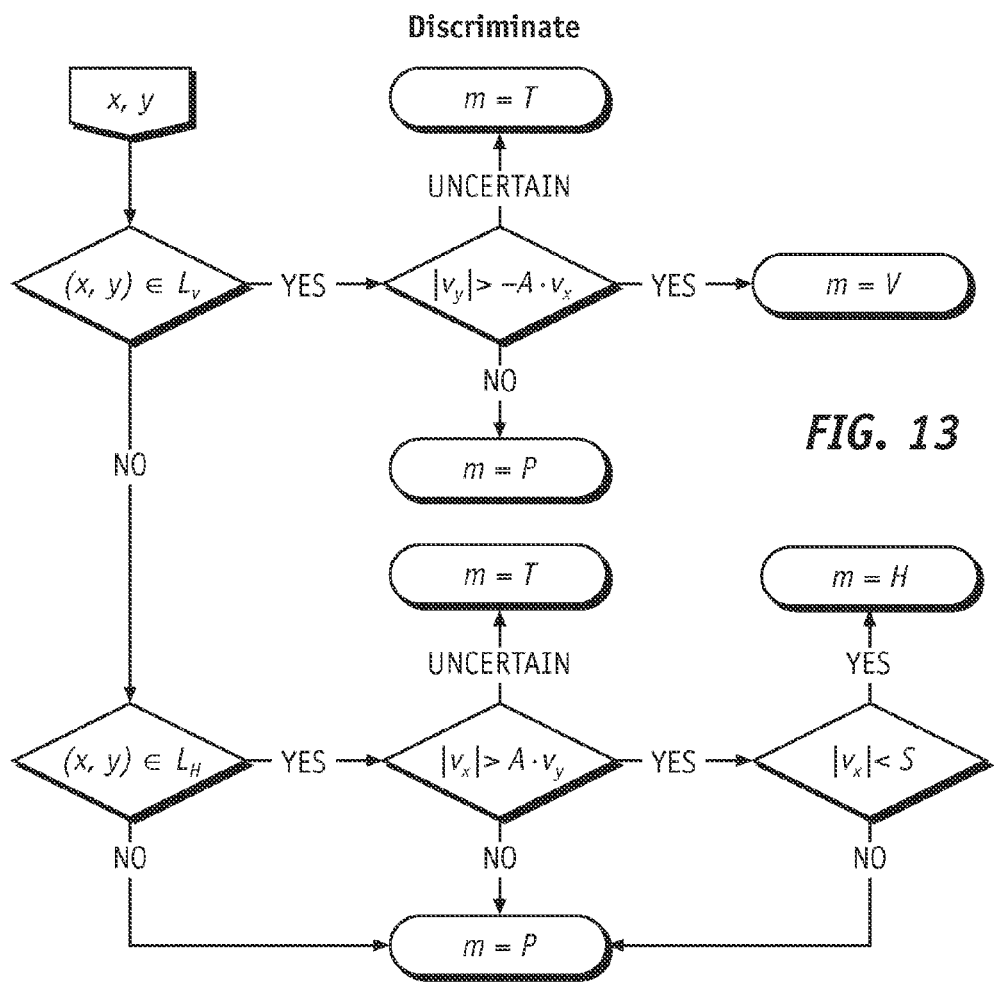
FIG. 13 shows an exemplary overall flow of monitoring pointing data and determining whether to use that data for pointing or scrolling.

The state variable, m, of FIG. 11 is appropriately managed by the Land( ) and Discriminate( ) methods, examples of which are shown in FIG. 12 and FIG. 13, respectively. Land( ) is responsible for monitoring where the finger initially approaches the touchpad. Discriminate( ) is responsible for examining initial directions and velocities of motion. Initially m is in the P state, corresponding to dispatching input reports for pointing.

The first task of the Land( ) method of FIG. 12 is to determine whether or not a finger is present on the pad. If the z value reported by the touchpad is below the finger present threshold, F, m reverts to the P state if it is not already in that state. If the finger on the pad is in either of the vertical or horizontal scrolling landing zones, then the previous value of z, stored in state variable l, is examined to determine if a finger arrival event has occurred. If the last report did not indicate a finger and the current report does indicate a finger then m transitions to the tentative scrolling state, T.

The Discriminate( ) method of FIG. 13 is only called when m is in the T state, indicating that an initial approach has been made to a scrolling landing zone. Depending upon the initially approached zone, the initial velocity in the zone is analyzed for alignment with the zone. This is accomplished by comparing the velocity component parallel with the zone with the component perpendicular to the zone. If the magnitude of the parallel component is larger than the perpendicular component multiplied by an alignment factor, A, then the initial velocity is judged sufficiently parallel to the zone. This perpendicular component used in the comparison is signed so that any initial motion that is more towards the perimeter of the pad than towards the center of the pad is judged sufficiently parallel to the zone.

If the initial approach is to the vertical scrolling zone and the initial velocity within the vertical scrolling zone is judged sufficiently parallel to the zone then m transitions directly to the vertical scrolling state, V. However, for a horizontal scrolling signature to be detected, the initial velocity is first compared to a maximum velocity, S. If this comparison succeeds, m transitions to the horizontal scrolling state, H. If any of the scrolling admissible tests fail, then m transitions back to P.

TABLE 3

| State Variable | Description |
| --- | --- |
| l | Previous z value |
| m | Mode state variable: P, T, H, V |

The state variables maintained by the modal signature detection functions are summarized in Table 3. Table 4 shows exemplary values for various free parameters when the signatures are used with a CPAD brand device as described above, although alternate implementations may use different values. Finger thresholds shown in Table 4 are in arbitrary units reported by the CPAD device when in absolute mode. Landing zone criteria are also in arbitrary units reported by the device. Velocities are shown in arbitrary touchpad units/second.

TABLE 4

| Parameter | Description | Exemplary Value |
| --- | --- | --- |
| F | z finger threshold | 30 |
| $L_H$ | Horizontal landing zone | y < 1592 |
| $L_V$ | Vertical landing zone | x > 5270 |
| A | Axis alignment factor | 2 |
| S | Maximum initial velocity for horizontal scrolling | 1360 |

Using the concepts and techniques set forth above, two dimensional inputs obtained from a position sensor or other device can be appropriately converted to meaningful one-dimensional signals suitable for directing scrolling or other user-interface features. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for indicating a scrolling function for a computing system with a touch sensor having a periphery, the method comprising the steps of:

entering a scrolling mode in response to detecting an initial approach to said touch sensor in an area of said touch sensor that is proximate to the periphery and a first movement along at least a portion of said touch sensor in a direction substantially parallel to the periphery of the touch sensor; and while in the scrolling mode, directing an amount of scrolling on the computing system in response to subsequent chiral movement that departs from the periphery of the touch sensor, wherein the amount of scrolling is determined as a function of a distance travelled during the subsequent chiral movement.

2. The method of claim 1 wherein the distance is based upon a length of at least a portion of a path on said touch sensor traversed during the subsequent movement.

3. The method of claim 1 wherein the first movement has a speed below a threshold speed.

4. The method of claim 1 wherein a first scrolling function is serviced responsive to the first movement being within a first area proximate to the periphery.

5. The method of claim 1 wherein a first scrolling function is serviced responsive to the first movement being within a first area proximate to the periphery and wherein a second scrolling function is serviced responsive to the first movement being within a second area proximate to the periphery.

6. The method of claim 1 wherein a first scrolling function is serviced responsive to the first movement being within a first area proximate to the periphery and wherein a second scrolling function is serviced responsive to the first movement with constrained initial velocity within a second area proximate to the periphery.

7. The method of claim 6 wherein said first area corresponds to a right edge of the touchpad and said first scrolling function is vertical scrolling and wherein said second area corresponds to a bottom edge of the touchpad and said second scrolling function is horizontal scrolling.

8. The method of claim 1 wherein the scrolling performed has a direction determined as a function of a chirality of the chiral movement across the touchpad.

9. The method of claim 8 wherein the chirality has a first sense when the subsequent chiral movement is primarily clockwise, and a second sense when the subsequent chiral movement is primarily counter-clockwise.

10. The method of claim 1 wherein the subsequent chiral movement is represented by a set of two-dimensional inputs, each of which substantially corresponds to an input distance and a trajectory, and wherein the scrolling is represented by a set of one-dimensional inputs, and wherein the directing comprises:

determining a current chirality of the set of two-dimensional inputs based upon an approximate two-dimensional heading for the two-dimensional inputs, wherein the current chirality has a first sense if the set of two-dimensional inputs exhibits a primarily clockwise trajectory and a second sense if the set of two-dimensional inputs exhibits a primarily counter-clockwise trajectory;

accumulating a one-dimensional variable having a magnitude that is a function of the input distances of the set of two-dimensional inputs and a sign that is based upon the current chirality; and extracting at least a portion of the accumulated one-dimensional variable as at least one of the set of one-dimensional inputs.

11. The method of claim 1 wherein the subsequent chiral movement is represented by a set of two-dimensional inputs, each of which substantially corresponds to an input distance and a trajectory, and wherein the directing comprises accumulating a one-dimensional variable having a magnitude that is a function of the input distances of the set of two-dimensional inputs, wherein the function includes applying a gain.

12. The method of claim 1 wherein the subsequent chiral movement is represented by a set of two-dimensional inputs, each of which substantially corresponds to an input distance and a trajectory, and wherein the scrolling is represented by a set of one-dimensional inputs, and wherein the directing comprises extracting at least a portion of an accumulated one-dimensional variable as at least one of the set of one-dimensional inputs, wherein the extracting comprises removing an integral portion of the accumulated one-dimensional variable as the at least one of the set of one-dimensional inputs.

13. The method of claim 1 wherein the subsequent chiral movement is represented by a set of two-dimensional inputs, each of which substantially corresponds to an input distance and a trajectory, and wherein the scrolling is represented by a set of one-dimensional inputs, and wherein the directing comprises extracting at least a portion of the accumulated one-dimensional variable as at least one of the set of one-dimensional inputs, and wherein the extracting step further comprises applying a ballistics function to the extracted portion to thereby expand the dynamic range of the at least one of the set of one-dimensional inputs.

14. A method for providing a scrolling function on a computing system in response to movement of a user's finger on a touch sensor, the method comprising the steps of:
responding to the user initially touching said touch sensor in an area near a periphery of the touch sensor;
in response to detecting movement of the user's finger along the periphery of said touchpad, entering a scrolling mode; and
while in the scrolling mode, directing the scrolling function of the computing system in response to a subsequent chiral motion of the finger that departs from the periphery, wherein the amount of scrolling produced on the computing system is determined as a function of a distance moved by the user's finger during the subsequent chiral motion.

15. The method of claim 14 wherein the direction of scrolling produced on the computing system is one direction if the subsequent chiral motion is primarily clockwise, and in an opposite direction if the subsequent chiral motion is primarily counter-clockwise.

16. A device for providing a set of one-dimensional inputs for a computing system in response to a two-dimensional input path, the device comprising:
a touch sensor having a periphery and a first area proximate to the periphery, wherein the touch sensor is configured to provide a set of two-dimensional inputs; and
a processor configured to receive the set of two dimensional inputs and to enter a scrolling mode responsive to detecting an initial approach to and initial movement within the first area proximate to the periphery of the sensing region, and, while in the scrolling mode, to directing an amount of scrolling on the computing system in response to the set of two dimensional inputs indicating a subsequent chiral movement that departs from the periphery of the touch sensor, wherein the amount of scrolling is determined as a function of a distance travelled during the subsequent chiral movement.

17. The device of claim 16 wherein each of the two-dimensional inputs corresponds to a segment of the two-dimensional input path having a heading and a direction, and wherein the processor is further configured to determine a current chirality of the set of two-dimensional inputs corresponding to the subsequent chiral movement, to accumulate a one-dimensional variable having a magnitude that is a function of the distances of the two-dimensional inputs and a sign that is based upon the current chirality, and to extract at least a portion of the accumulated one-dimensional variable as at least one of the set of one-dimensional inputs for the computing system.

18. The device of claim 17 wherein the current chirality has a first sense if the two-dimensional path exhibits a primarily clockwise trajectory and a second sense if the two-dimensional path exhibits a primarily counter-clockwise trajectory.

19. The device of claim 16 wherein the touch sensor is a touchpad.

20. The device of claim 16 wherein the touch sensor is a capacitive touch sensor.

* * * * *